March 10, 1936. P. ANGREMY 2,033,804
MANUFACTURE OF MARQUETRY PANELS
Filed July 16, 1934 6 Sheets-Sheet 4

Fig. 4

Inventor
Pierre Angremy
By John Q. Brady
Attorney

March 10, 1936.  P. ANGREMY  2,033,804
MANUFACTURE OF MARQUETRY PANELS
Filed July 16, 1934  6 Sheets—Sheet 5

Fig. 5

Inventor
Pierre Angremy,
by John Q. Brady
Attorney

March 10, 1936.                P. ANGREMY                 2,033,804
                    MANUFACTURE OF MARQUETRY PANELS
                   Filed July 16, 1934        6 Sheets-Sheet 6

Inventor
Pierre Angremy
By John B. Brady
Attorney

Patented Mar. 10, 1936

2,033,804

UNITED STATES PATENT OFFICE 2,033,804

MANUFACTURE OF MARQUETRY PANELS

Pierre Angremy, Capdenac-Gare, France

Application July 16, 1934, Serial No. 735,505
In France June 20, 1934

9 Claims. (Cl. 144—7)

In the utilization of woods of rare kinds, sawmill waste and pieces of wood too small to be used for ordinary purposes represent a rather high value. For example, in the case of walnut wood, the logs of which have a small yield on account of inherent defects in the wood, it would be highly advantageous to be able to recover the value or part of the value of the wood which is ordinarily wasted or at the best has hitherto been used only as firewood.

The primary object of the present invention is to provide a machine permitting the utilization of these wastes and small pieces of wood even of very small dimensions (say, down to 5 x 5 centimetres as a minimum) for the automatic manufacture of marquetry panels which are of uniform dimensions and well constructed with practically imperceptible joints of the grooved and tongued type.

A further object of the invention is to provide an automatic machine for the continuous manufacture of marquetry panels from small pieces of wood ordinarily wasted, said machine comprising novel means for relatively displacing the assembled elements of the panels prior to the final setting for oblique sawing or cutting of the edges of the said elements to produce an echelon or zig-zag profile and to enable the obtaining, subject to a judicious choice of colourings and grains of the pieces of wood, of chequered, striped or mosaic marquetry effects which render the panels utilizable in cabinet work and therefore of high commercial value.

A still further object of the invention is to provide a machine for making marquetry panels by assembly of small pieces of wood, comprising, in combination, means for displacing the pieces longitudinally in succession, means for effecting matched tongues and grooves at opposite side edges of the pieces during the longitudinal displacement, means for displacing the tongued-and-grooved pieces laterally in succession to engage the tongues and grooves of adjacent pieces, and means for automatically actuating the longitudinally-displacing means and the laterally-displacing means in continuous alternation.

Yet another object of the invention is to provide a machine for making marquetry panels by assembly of small pieces of wood, comprising, in combination, a machine table, means for displacing the pieces longitudinally in succession over the table, substantially continuous lateral guiding means for the longitudinally displaced pieces, means for effecting matched tongues and grooves at opposite side edges of the longitudinally displaced pieces, means for displacing the tongued-and-grooved pieces laterally in succession to engage the tongues and grooves of adjacent pieces, and means for automatically actuating the longitudinally-displacing means and the laterally-displacing means alternately and repeatedly.

Still further objects of the invention are to provide in machines as aforesaid means for resiliently guiding the small pieces of wood laterally during the longitudinal displacement, for maintaining the said pieces resiliently pressed upon the machine table during the same movement by means acting vertically in at least two places on each piece of wood, and for guiding the pieces both laterally and vertically during their transverse displacement, any of the said means being independently adjustable according to the size of the pieces of wood.

Other objects of the invention will be apparent from the following description of an embodiment of the invention with reference to the attached drawings.

Figure 3:
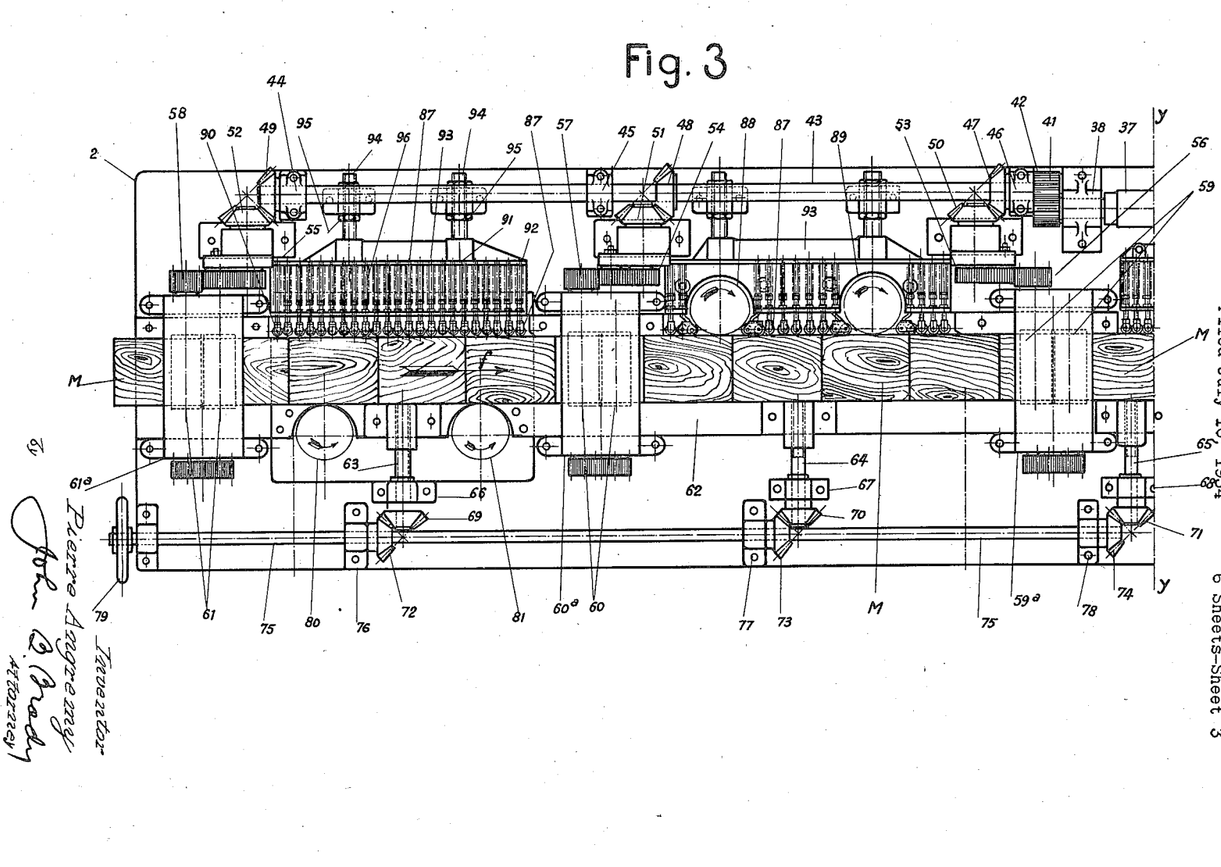
Figs. 3 and 4 represent, in two fragmentary views adapted to be connected end to end along the line Y—Y, the machine viewed in top plan.

The base or frame 1 of the machine is hollow and carries a table 2 on which the wood pieces M to be assembled together into boards are adapted to travel. The travelling motion of such wood pieces M takes place according to the well known principle of the two relatively perpendicular displacements, first longitudinally (see the arrow f in Fig. 3) with a view to producing aligned grooves and tongues at the respective edge faces of the wood pieces M, afterwards transversely (see the arrow f' in Fig. 4) with a view to assembling said wood pieces side by side by interengagement of their tongues and grooves.

The motive power which causes the wood pieces M to travel as aforesaid along the table 2 is derived from an electric motor 3 connected by a coupling 4 to a worm-gearing speed reducer 5 on the driven shaft of which is keyed a sprocket wheel 6 which transmits its rotation by a chain 7 to another sprocket wheel 8 keyed on the end of a transmission shaft 9 supported at a slight distance above the table 2 in a bearing 10. The shaft 9 drives a dog plate 11 connected to a sleeve 12 articulated to the one end of a lever 13 pivotally fulcrumed on a pin 14 and articulated at its other end to a yoke 15 secured to a rod 16 which terminates in an abutment finger 17 and is constantly subjected to the influence of a spring 18 coiled about the rod between a collar 19 on the rod and a stationary abutment 20. The abutment finger 17 is adapted to be pushed together with the rod 16 against the action of the spring 18 by each successive wood piece M when the latter reaches the end of its longitudinal displacement, as will be described hereafter in more detail.

Figure 4:
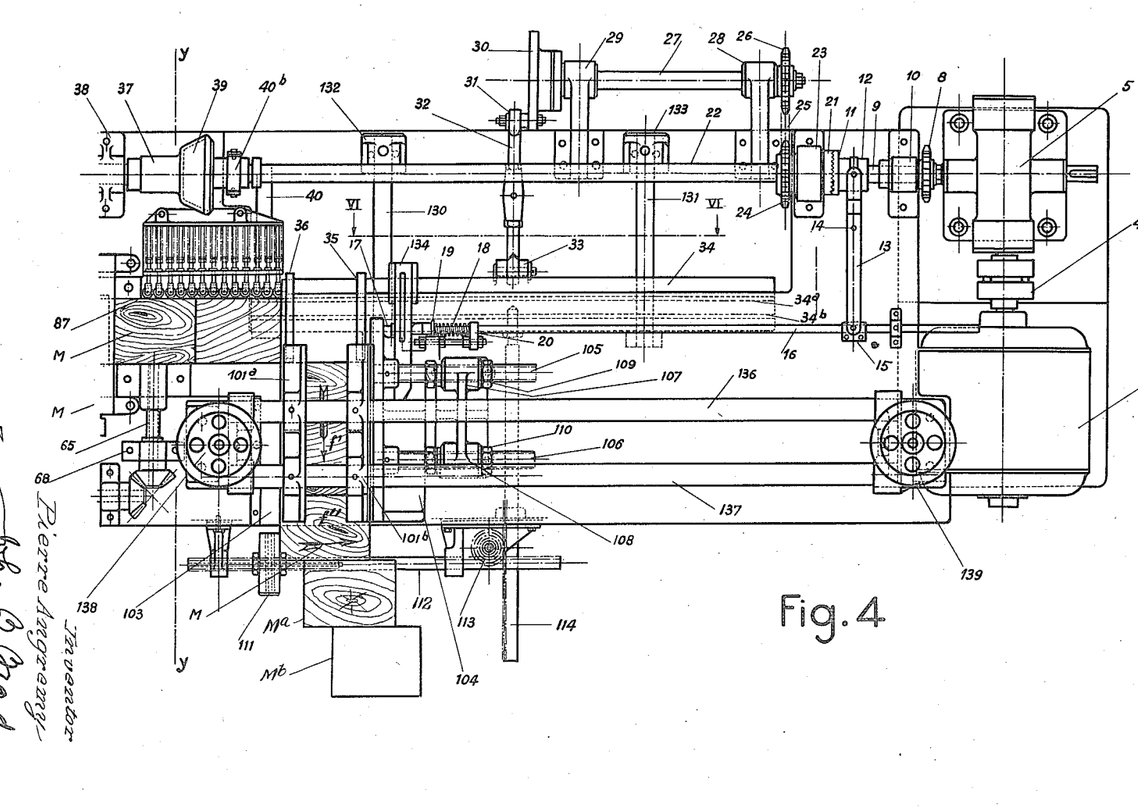
Figure 7:
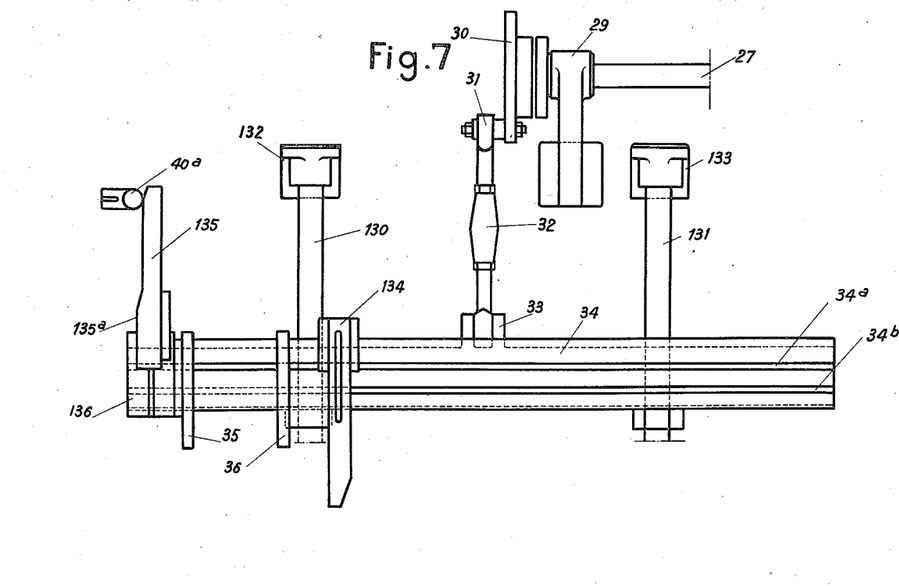
Fig. 7 is a fragmentary view showing the carriage and accessory members.

Opposed to the dog plate 11 is situated a companion dog plate 21 keyed to a shaft 22 rotatably supported in a bearing 23 and fitted with a sprocket wheel 24 connected by a chain 25 to another sprocket wheel 26 keyed to a shaft 27 rotatably supported in bearings 28, 29 and carrying a crank disc 30 whose crank pin 31 is connected by an adjustable link 32 to a pivot 33 formed on a carriage 34 provided with grooves 34a, 34b (Fig. 7) receiving tail portions of two pushers 35, 36 adapted to push the wood pieces M sidewise in the transverse direction shown by the arrow f', in Fig. 4 that is to say at right angles to their direction of longitudinal travel (shown by the arrow f in Fig. 3) and at the required frequency.

Figure 6:
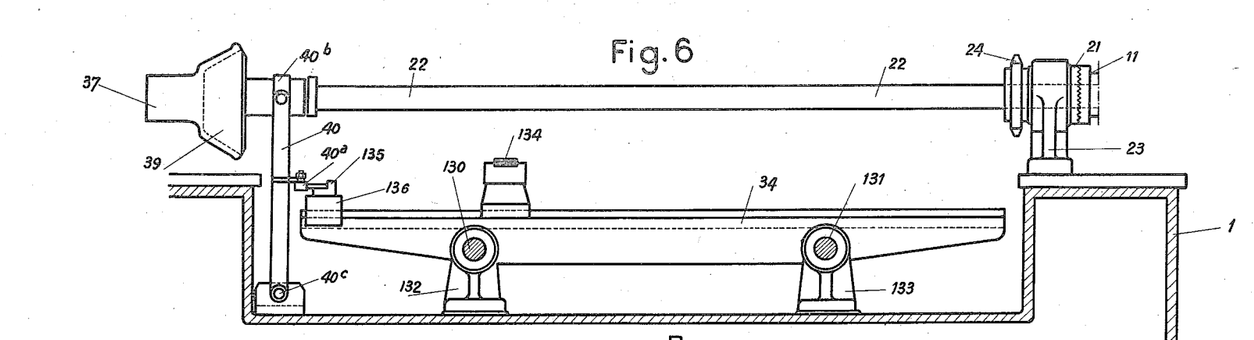
Fig. 6 is a section on the line VI—VI (Fig. 4) showing the carriage actuating the clutch for ensuring the intermittent longitudinal progression of the wood pieces.

The carriage 34 is guided on two rods 130, 131 carried in bearing blocks 132, 133 (see Figs. 6 and 7) secured on the bottom of a recess formed in the base or frame 1 of the machine. The carriage 34 carries a latch 134 adapted to hold the rod 16 in a suitable position during the full stroke across the frame 1. Moreover, the carriage 34 carries at one of its ends a finger 135 supported by a block 136 and formed with a profiled outer edge 135a. Against said edge abuts a roller 40a carried by a lever 40 fulcrumed on a pin 40c and articulated through a fork 40b to the shaft 22. Said fork can have either the form shown in Fig. 4 or the form shown in Fig. 6.

Aligned with the shaft 22 is located another shaft 37 rotatably supported in a bearing 38. The shafts 22, 37 are connected by a cone clutch 39 actuated by the lever 40 which in turn is brought into clutching position when the carriage 34 is outwardly shifted by the link 32. The clutch 39 thus only transmits the drive when the pushers 35, 36 after having completed their pushing stroke have resumed their inoperative position. The ramp 135a then contacts with the roller 40a (see Fig. 7) which by pressing on the lever 40 brings the clutch 39 to its operative position.

Figure 1:
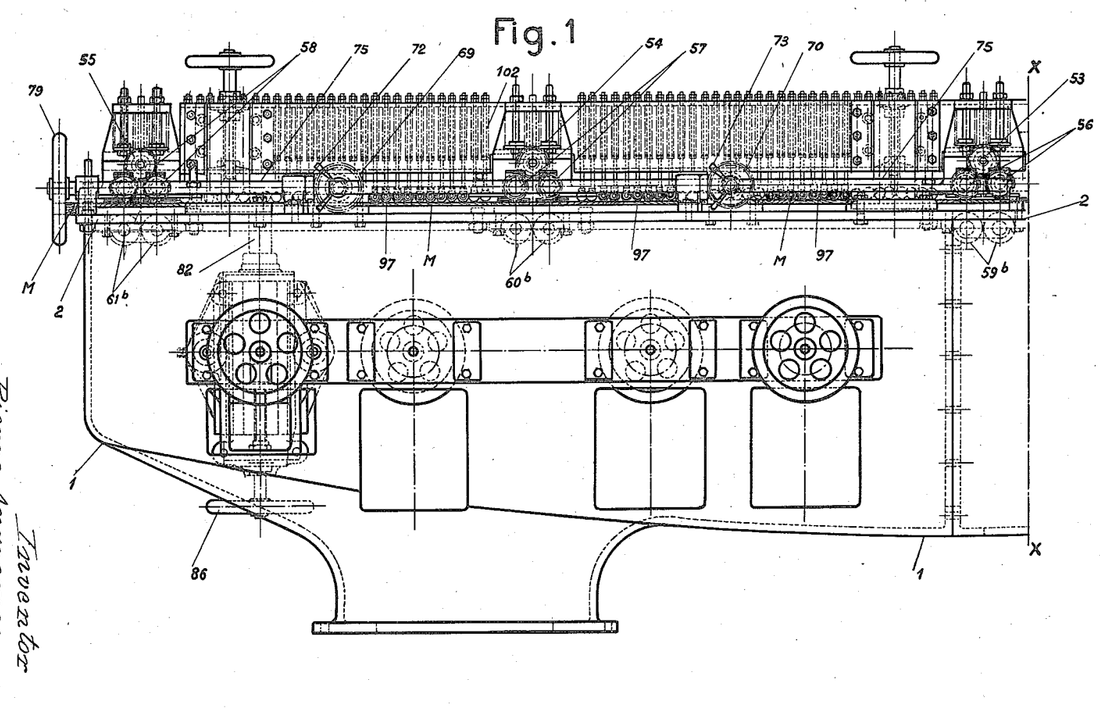
Figs. 1 and 2 represent, in two fragmentary views adapted to be connected end to end along the line X—X, an embodiment of the machine viewed in elevation, only one cutter out of four being shown in dotted lines.

By means of spur gears 41, 42 and shaft 37 drives another shaft 43 rotatably supported in bearings 44, 45, 46 and carrying three bevel pinions 47, 48, 49 which constantly mesh with three bevel pinions 50, 51, 52 respectively driving spur pinions 53, 54, 55 which, in turn, drive gears 56, 57, 58 whereby rollers 59, 60, 61 are directly driven. Said rollers are located parallel to the surface of the table 2 and have a rough surface for driving the small wood pieces M one after the other, as shown by the arrow f in Fig. 3. The driving cylinders 59, 60, 61 are protected by guard plates 59a, 60a, 61a and are located opposite idle rollers 59b, 60b, 61b (Fig. 1) arranged under the table 2 and projecting upwards through apertures formed in said table to guide the wood pieces M.

Parallel to the table 2 is arranged a straight girder 62 (Fig. 3) supported by threaded pins 63, 64, 65 which are rotatably mounted in bearings 66, 67, 68 and carry bevel pinions 69, 70, 71 which mesh respectively with bevel pinions 72, 73, 74 keyed to a rod 75 rotatably supported in bearings 76, 77, 78 secured to the table and carrying a hand or capstan wheel 79. Rotation of said wheel permits adjustment of the position of the girder 62 the function of which is to guide continuously one of the side edge faces of the wood pieces M as they are longitudinally driven end to end (as shown by arrow f) by the rollers 59, 60, 61. Thus, the wood pieces M cannot in spite of their small size deviate from the correct longitudinal path shown by the arrow f in Fig. 3. This result is due to the co-operation of the girder 62 and guiding means that will be described hereafter.

Figure 5:
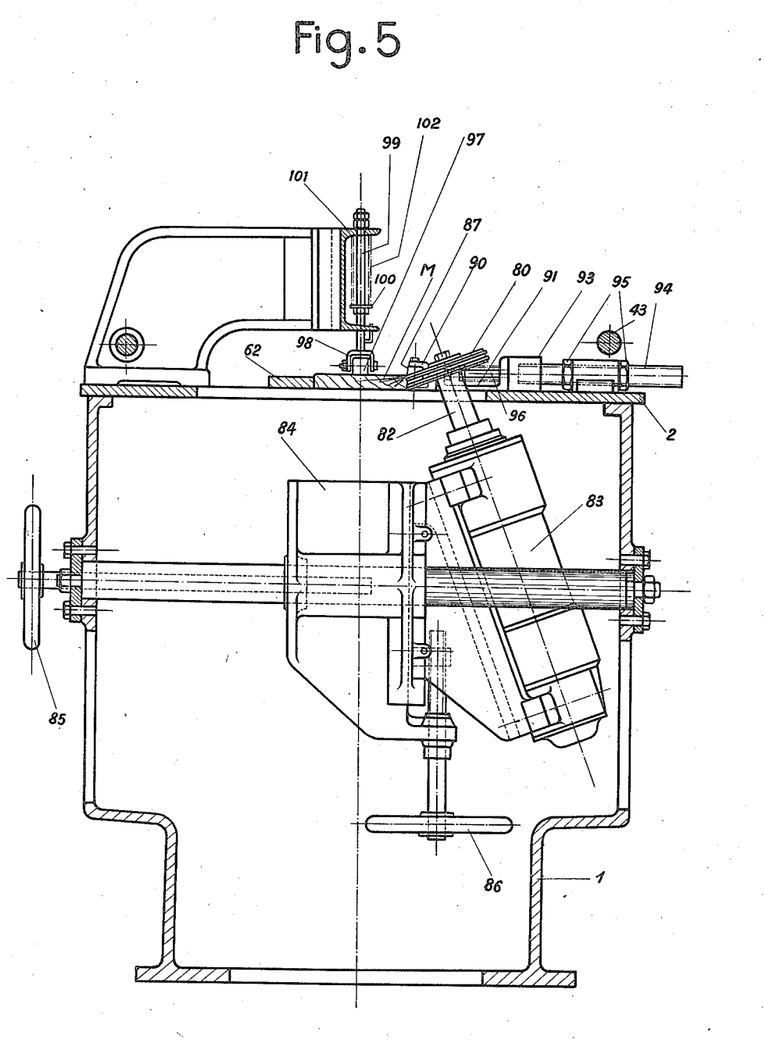
Fig. 5 is a transverse section of the machine.

The guiding girder 62 extends upwardly to the extent of approximately one eighth of an inch opposite two notches formed therein, in which are received two gyratory cutters 80, 81 the profiles of which are such as to cut one or more grooves in the edges of the aligned wood pieces M. Said cutters 80, 81 are obliquely disposed, as shown in Fig. 5; each of them is keyed to a shaft 82 driven by an independent electric motor 83 supported by a frame 84 housed in the hollow base 1 of the machine and capable of being adjusted in position by means of hand or capstan wheels 85, 86 according to the varying dimensions of the wood pieces M to be assembled together.

The side edge face of each wood piece M opposite to the one which contacts with the guiding girder 62 is constantly subjected to the uniform (adjustable) pressure of a number of aligned pressing rollers 87 which are sufficiently small and close together to ensure that, regardless of the size of the wood pieces M, each of said pieces constantly contacts with at least two pressing rollers 87 throughout its travel. In the embodiment shown in the drawings, it will be seen that each wood piece M is subjected to the pressure of more than two rollers 87.

At two positions, the sequence of aligned rollers 87 has a gap for receiving two rotary cutters 88, 89 arranged in the same way as the cutters 80, 81 and adapted to cut in the adjacent edge face of the wood pieces M one or more tongues.

Each pressing roller 87 is rotatably carried by a small yoke 90 supported by a spindle 91 having a collar 92 and arranged for sliding motion in a cross bar 93 the position of which can be adjusted by means of threaded pins 94 held stationary by lock nuts 95 relative to the table 2. A small spiral spring 96 is coiled around each spindle 91 between its collar 92 and the cross bar 93 for imparting to the roller 87 a certain easiness of motion, so as to leave the longitudinal motion of the wood pieces M unhindered without interrupting the pressure on their side edge faces.

In the course of their longitudinal motion (as shown by the arrow f in Fig. 3) the small wood pieces M are continuously guided and pressed not only by the side rollers 87 but also by similar rollers 97 (Fig. 1) adapted to continuously press their upper faces, two at least of such pressing rollers being provided for each wood piece so as to constitute a minimum of two fulcrum points and to hold the succession of wood pieces perfectly horizontal. This is necessary for ensuring that the cutters 80, 81, 88, 89 cut the edge faces of the wood pieces at exactly predetermined and constant levels. This is the condition for a proper scarfing of the wood pieces side by side, as will appear hereafter.

Each roller 97 exerting its pressure downwardly is revolubly mounted (see Fig. 5) in a small yoke 98 supported by a spindle 99 having a collar 100 and arranged for sliding motion in a cross bar 101. A spiral spring 102 coiled around each sliding spindle 99 between its collar 100 and the cross bar 101 imparts to each roller 97 a certain elasticity which permits the same to leave the motion of the wood pieces M unhindered while suitably pressing them, one after the other, as they pass by.

Figure 2:
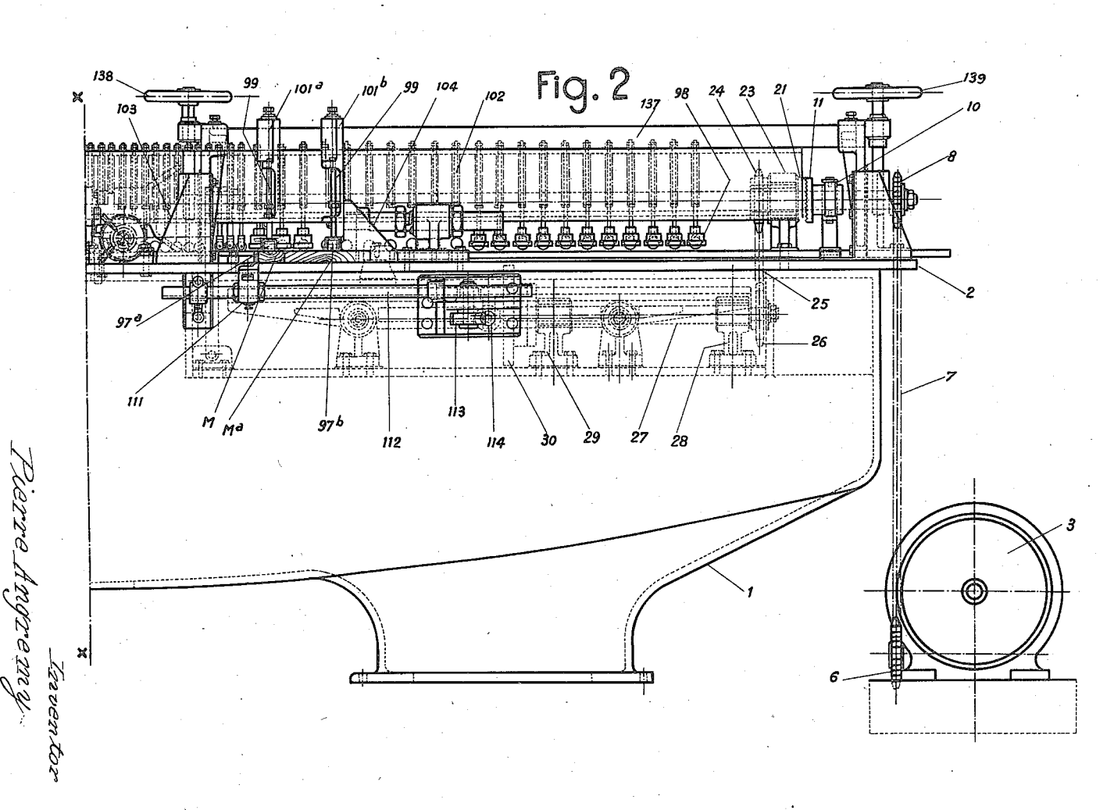

Opposite the pushers 35, 36, the table 2 carries two angle plates 103, 104 (Fig. 4) which define between them a channel perpendicular to the direction $f$ in which the wood pieces M travel longitudinally. Said wood pieces which are now provided on their respective edge faces and at corresponding levels with tongues and grooves of equal size and shape since they were subjected to the combined action of the pressing and guiding rollers 87 and 97, the girder 62 and the cutters 80, 81 and 88, 89 now travel side by side in the transverse channel defined as aforesaid between the guiding plates 103, 104. The direction of transverse motion of the wood pieces side by side is shown by the arrow $f'$ (see Fig. 4). During this transverse motion, the wood pieces are guided as shown in Fig. 2 by rollers 97a, 97b which press them downwardly and are resiliently supported by cross bars 101a, 101b.

The plate 104 is adjustable in position for accommodating wood pieces M of varying lengths. To that effect, the plate 104 is provided with rods 105, 106 slidably mounted in stationary sleeves 107, 108 and held stationary, in adjusted positions, by lock nuts 109, 110. Moreover, the unit can be shifted on the table 2 due to the provision of a series of holes in the latter, through which locking bolts may be engaged. Slides 136, 137 adjustable vertically by means of hand or capstan wheels 138, 139 are also provided for receiving one or more sets of vertical pressing rollers similar to the ones which act on the wood pieces while they move in the $f$ direction, for the purpose of holding said wood pieces side by side in firm contact with the table 2 throughout their area.

When leaving the transverse channel, each wood piece M passes along an abutment block 111 secured to a rack 112 which meshes with a toothed wheel 113 engaging with another rack 114 connected to the carriage 34. The reciprocating motions of said rack 114 are therefore responsive to the impulses of the crank disk 30. The abutment block 111 is intended to push each wood piece M in the direction shown by the arrow $f''$ (see Fig. 4) to an offset position designated by Ma, so as to give the line of wood pieces assembled side by side a stepped profile, as shown fragmentarily by Ma—Mb.

A spraying or other suitable device is suitably located for projecting a jet of adhesive of suitable composition in the junction interstices between the wood pieces scarfed side by side and travelling transversely in the $f'$ direction (see Fig. 4), whereby said wood pieces can be invariably cemented to one another. Said spraying or other device is not shown as it may be of known or conventional structure, it can be located at any suitable position, for example adjacent the meeting point of the longitudinal and transverse channels $f$ and $f'$. Evidently the adhesive sprayed by the device on to the wood pieces does not set at once so that despite the mutual scarfing of the wood pieces moving transversely as shown by the arrow $f'$, the abutment block 111 can without difficulty push each wood piece in turn to the position Ma (see Fig. 4), as shown by the arrow $f''$.

Thus at the outlet end of the machine, there is continuously furnished a strip of wood pieces M scarfed side by side but showing a zig-zag outline. This permits by an oblique cutting (with the aid of any suitable saw) to obtain a chequered or chevron effect. Composite or marquetry boards as the one described in co-pending application No. 735,506 can thus be continuously and automatically made.

Declutching means of known form (not shown) may be provided for bringing the abutment block 111 into its operative or inoperative position. Thus a straight or zig-zag strip may be obtained at will.

Briefly described, the operation of the machine is as follows:—

The small wood pieces M previously sorted according to predetermined measure or width and length (preferably of a size not less than 2 inches) are manually inserted one after the other at the inlet end of the machine (on the left hand side in Fig. 3) and engaged under the driving cylinders 61. When the motor 3 has been set in motion, it drives (through the medium of the shaft 43, and the several gear trains to the driving cylinders 59, 60, 61) the wood pieces M end to end in the longitudinal direction shown by arrow $f$. The wood pieces M then move without undergoing any deviation even if they are quite small, due to the combined guiding and pressing action of the girder 62, side rollers 87 and upper rollers 97. Thus the cutters 80, 81 and 88, 89 cut equally shaped and sized tongues and grooves at exactly the same levels on the respective edge or side faces of the wood pieces M. On reaching the end of their longitudinal or end to end motion $f$ the wood pieces M can thus be scarfed side by side quit easily since their tongues and grooves readily interengage one another without causing any wood piece to project or buckle up, the joints being hardly visible.

When it reaches the end of its longitudinal motion $f$, each wood piece M pushes the abutment finger 17 which, against the action of the spring 18 and due to the system of members 12, 13, 16 causes the coupling members 11, 21 to be clutched together while disengaging the clutch 39. Thus the wood pieces M temporarily cease to move in the longitudinal direction $f$. Simultaneously, under the action of the crank disc 30, the pushers 35, 36 push the wood piece that has thus covered its fullest longitudinal stroke sideways in the direction shown by the arrow $f'$ that is to say into the transverse channel defined between the plates 103, 104. The wood piece thus pushed off sideways is held in firm contact with the table by the rollers 97a, 97b and is thus in correct position for causing its tongues or grooves (as the case may be) to fit into the grooves or tongues of the preceding wood piece. The spraying of the adhesive takes place at the same time as aforesaid. As soon as any wood piece has been pushed sidewise to a sufficient extent by the pushers 35, 36 for freeing the abutment finger 17, the latter and the rod 16 are urged back by the spring 18. This disengages the coupling member 11, 21 and re-engages the clutch 39. The longitudinal motion of the wood pieces M in the direction $f$ is then at once resumed under the guiding action of the rollers 97.

As will be understood, the progression of the wood pieces M either end to end in the longitudinal direction f or side by side in the transverse direction f' takes place step by step that is to say intermittently but in a continuously automatic and guided way since at all times all faces of the wood pieces remain pressed and guided. The intermittent stoppage of their progression due to the declutching action of the abutment finger 17 prevents any overfeed or choking of the machine. This stoppage further gives the adhesive enough time to percolate through the joints between the consecutive wood pieces and thus ensure a better cementing action.

The action of the abutment block 111 which brings each wood piece to the position Ma at its egress from the transverse channel of the machine also occurs intermittently according to the same frequency. The oblique cutting of the offset wood pieces Ma—Mb may be performed in any approved way by means of any suitable saw (not shown).

I claim:—

1. Machine for making marquetry panels by assembly of small pieces of wood, comprising, in combination, means for displacing the pieces longitudinally in succession, cutters for producing matched tongues and grooves at opposite side edges of the pieces during the longitudinal displacement, lines of close spring-urged rollers guiding each wood piece horizontally and vertically throughout its longitudinal motion and holding all pieces in co-planar engagement with the cutters, means for displacing the tongued-and-grooved pieces laterally in succession to engage the tongues and grooves of adjacent pieces, means for offsetting each piece of the mutually engaged lateral series endwise relative to the series to give said series a stepped profile, and means for automatically actuating the longitudinal-displacing means in continuous alternation with the lateral-displacing means and the endwise-displacing means.

2. Machine for making marquetry panels by assembly of small pieces of wood, comprising, in combination, a continuous table, means for displacing the pieces longitudinally in succession over the table, perpendicular lines of close spring-urged rollers for resiliently pressing the pieces upon the table, said rollers being disposed to bear upon each piece in at least two places throughout its longitudinal displacement, said pressing rollers being adjustable according to the thickness of the pieces, cutters for producing matched tongues and grooves at opposite side edges of the pieces during the longitudinal displacement, means for displacing the tongued-and-grooved pieces laterally in succession over the table to engage the tongues and grooves of adjacent pieces, means for offsetting each piece of the mutually engaged lateral series endwise relative to the series to give said series a stepped profile, and means for automatically actuating the longitudinal-displacing means in continuous alternation with the lateral-displacing means and the endwise-displacing means.

3. Machine for making marquetry panels by assembly of small pieces of wood, comprising, in combination, a continuous table, means for displacing the pieces longitudinally in succession over the table, perpendicular lines of spring-urged rollers for resiliently pressing the pieces upon the table and disposed to bear upon each piece in at least two places throughout its longitudinal displacement, substantially continuous lateral guiding means for the longitudinally moving pieces, cutters for producing matched tongues and grooves at opposite side edges of the longitudinally moving pieces, means for displacing the tongued-and-grooved pieces laterally in succession to engage the tongues and grooves of adjacent pieces, means for offsetting each piece of the mutually engaged lateral series endwise relative to the series to give said series a stepped profile, and means for automatically actuating the longitudinal-displacing means in alternation with the lateral-displacing means and the endwise displacing means.

4. Machine for making marquetry panels by assembly of small pieces of wood, comprising, in combination, a continuous table, means for displacing the pieces longitudinally in succession over the table, upstanding cutters for producing matched tongues and grooves at opposite side edges of the longitudinally moving pieces, guiding means having recesses for said cutters and bearing continuously against the longitudinally moving wood pieces, means for displacing the tongued-and-grooved pieces laterally in succession to engage the tongues and grooves of adjacent pieces, means for horizontally and vertically guiding the laterally moving pieces, said several guiding means being independently adjustable according to the size of the pieces, means for offsetting each piece of the mutually engaged lateral series endwise relative to the series to give said series a stepped profile, and means for automatically actuating the longitudinal-displacing means in continuous alternation with the lateral-displacing means and the endwise displacing means.

5. Machine for making marquetry panels by assembly of small pieces of wood, comprising, in combination, a continuous table, means for displacing the pieces longitudinally in succession over the table, cutters for producing matched tongues and grooves at opposite side edges of the wood pieces during the longitudinal displacement, a girder having recesses for the cutters and bearing against one side edge of the wood pieces, perpendicular lines of spring-urged rollers for resiliently pressing the pieces upon the table and girder respectively, said rollers being disposed to bear upon each piece in at least two places throughout its longitudinal displacement, means for displacing the tongued-and-grooved pieces laterally in succession over the table to engage the tongues and grooves of adjacent pieces, spring-urged rollers for horizontally and vertically guiding the laterally moving pieces, means for partially displacing each piece of the mutually engaged lateral series endwise relative to the series to give said series a stepped profile, and means for automatically actuating the longitudinal-displacing means in continuous alternation with the lateral-displacing means and the endwise-displacing means.

6. Machine for making marquetry panels by assembly of small pieces of wood, comprising, in combination, a continuous flat table, driving rollers for displacing the pieces longitudinally in succession over the table, primary spring-urged rollers for resiliently pressing the pieces upon the table to bear upon each piece in at least two places throughout its longitudinal displacement, a guiding girder bearing on one side edge of the longitudinally moving pieces, secondary spring-urged guiding rollers opposed to the girder and disposed to bear upon the opposite side edge of each piece in at least two places throughout its longitudinal displacement, cutters for producing matched tongues and grooves at opposite side edges of the longitudinally moving pieces, gaps being provided in the girder and secondary rollers for receiving the respective cutters, means for displacing the tongued-and-grooved pieces laterally in succession to engage the tongues and grooves of adjacent pieces, means for horizontally and vertically guiding the laterally moving pieces, said pressing rollers, said girder and said guiding means being independently adjustable according to the size of the pieces, means for partially displacing each piece of the mutually engaged lateral series endwise relative to the series to give said series a stepped profile, a clutch actuatable responsive to the arrival of each wood piece at the end of its longitudinal displacement for temporarily stopping the driving rollers, and means for automatically actuating the longitudinal-displacing means in continuous alternation with the lateral-displacing means and the endwise-displacing means.

7. Machine for making marquetry panels by assembly of small pieces of wood, comprising, in combination, a table, driving rollers for moving the wood pieces longitudinally end to end over the table, upstanding cutters for producing matched tongues and grooves in the opposite side edges of the wood pieces as they move longitudinally, a girder bearing on one side edge of the wood pieces and having recesses receiving the adjacent cutters, a line of primary spring-urged close rollers bearing on the opposite side edge of the wood pieces, gaps in said line of rollers receiving the adjacent cutters, a line of secondary close spring-urged rollers bearing on the top faces of the wood pieces and holding them in co-planar engagement with the cutters, a clutch actuatable responsive to the arrival of each wood piece at the end of its longitudinal motion for temporarily stopping the driving rollers, pushers operable by the clutch responsive to said actuation for moving the tongued-and-grooved wood pieces laterally so as to mutually scarf the tongues and grooves of contiguous wood pieces, a pair of plates defining a transverse channel holding said pieces as they move laterally, a line of tertiary close spring-urged rollers pressing said laterally moving wood pieces on the table, means for partially displacing each wood piece as it comes out of the transverse channel to give to the series of wood pieces a stepped profile, and means for automatically actuating the driving rollers in continuous alternation with the pushers, said means being controlled by the clutch.

8. Machine for making marquetry panels by assembly of small pieces of wood, comprising, in combination, a table, driving rollers for moving the wood pieces longitudinally over the table, cutters for producing matched tongues and grooves in the opposite side edges of the wood pieces as they move longitudinally, a girder bearing on one side edge of the wood pieces and having recesses receiving the adjacent cutters, a line of primary spring-urged close rollers bearing on the opposite side edge of the wood pieces, gaps in said line of rollers receiving the adjacent cutters, a line of secondary close spring-urged rollers bearing on the top faces of the wood pieces and holding them in co-planar engagement with the cutters, a clutch actuatable responsive to the arrival of each wood piece at the end of its longitudinal travel for temporarily stopping the driving rollers, pushers operable by the clutch responsive to said actuation for moving the tongued-and-grooved wood pieces laterally so as to mutually scarf the tongues and grooves of contiguous wood pieces, a pair of upstanding plates defining a transverse channel holding said pieces aligned as they move laterally, a line of tertiary close spring-urged rollers pressing said laterally moving wood pieces on the table, an abutment block located near the outlet of said channel for partially displacing endwise each wood piece as it comes out of the channel so as to offset each such piece relative to the next one to give to the series of scarfed wood pieces a stepped profile, and interconnecting means for timely relating the actuation of said block and said clutch.

9. Machine for making marquetry panels by assembly of small pieces of wood, comprising, in combination, a table, driving means for moving the wood pieces longitudinally end to end over the table, cutters for producing matched tongues and grooves at opposite side edges of the wood pieces during their longitudinal motion, pushing means for shifting over the table each tongued-and-grooved wood piece laterally at the end of its longitudinal motion so as to cause it to engage the tongues or grooves of an adjacent piece, resilient means for horizontally and vertically guiding the longitudinally moving wood pieces and for holding them in co-planar engagement with the cutters, means for horizontally and vertically guiding the series of laterally moving wood pieces, clutching means actuatable responsive to the arrival of each wood piece at the end of its longitudinal motion for temporarily stopping the driving means and for operating the pushing means, a carriage co-operating with the clutching means and pushing means, an abutment block for offsetting each wood piece at the end of its lateral motion relative to the series of pieces scarfed side by side, and a rack gear interconnecting the carriage and abutment block for timely operating the latter at predetermined intervals corresponding to the actuation of said pushing means.

PIERRE ANGREMY.